(12) United States Patent
Chen

(10) Patent No.: US 7,363,639 B2
(45) Date of Patent: Apr. 22, 2008

(54) INTEGRATED REPRODUCING/RECORDING APPARATUS

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 811 days.

(21) Appl. No.: 10/816,984

(22) Filed: Apr. 2, 2004

(65) Prior Publication Data

US 2004/0202065 A1    Oct. 14, 2004

(30) Foreign Application Priority Data

Apr. 11, 2003    (TW)    ............................. 92205660 U

(51) Int. Cl.
*G11B 13/04*    (2006.01)
(52) U.S. Cl. ...................................... 720/656
(58) Field of Classification Search ................ 720/656; 369/30.98, 34.01
See application file for complete search history.

(56) References Cited

U.S. PATENT DOCUMENTS

| 5,450,379 | A | * | 9/1995 | Fujimori et al. ......... 369/275.1 |
| 5,793,729 | A | | 8/1998 | Soga et al. |
| 5,841,752 | A | | 11/1998 | Ohmori et al. |
| 6,560,066 | B2 | | 5/2003 | Imai et al. |
| 6,570,736 | B2 | | 5/2003 | Noda |
| 6,577,461 | B2 | | 6/2003 | Satoh et al. |

\* cited by examiner

*Primary Examiner*—Angel Castro
(74) *Attorney, Agent, or Firm*—Wei Te Chung

(57) ABSTRACT

An integrated reproducing/recording apparatus (10) comprises a magnetic reproducing/recording device (11), an optical reproducing/recording device (12) and a spindle (13) located therebetween. The magnetic reproducing/recording device has a magnetic disk (111) with a center hole (113) and a magnetic pickup head (112). The optical reproducing/recording device has an optical disk (121) with a center hole (123) and an optical pickup head (122). The spindle has fixtures at each end thereof. The magnetic disk or the optical disk is selectively fixed on the spindle.

29 Claims, 4 Drawing Sheets

INTEGRATED REPRODUCING/RECORDING APPARATUS

BACKGROUND OF THE INVENTION

1. Field of the Invention

The present invention generally relates to reproducing/recording apparatuses, and more particularly to an integrated reproducing/recording apparatus which can reproduce/record on two different storage mediums.

2. Description of Prior Art

There are two conventional types of signal reproducing/recording devices: optical reproducing/recording devices and magnetic reproducing/recording devices. Optical reproducing/recording devices reproduce/record signals on an optical storage medium using an optical pickup head. The optical storage medium can be a CD (compact disk) or a DVD (digital versatile disk). The capacity of an optical storage medium is less than 4.7 GB. Magnetic reproducing/recording devices reproduce/record signals on a magnetic storage medium using a magnetic pickup head. The capacity of a magnetic storage medium is larger than that of the optical storage medium, bigger than 4.7 GB.

A conventional computer system uses both an optical reproducing/recording device and a magnetic reproducing/recording device at the same time, each reproducing/recording device being separately located therein. This arrangement occupies too much space in the conventional computer system, particularly in a portable computer system.

An integrated reproducing/recording apparatus is desired.

SUMMARY OF THE INVENTION

Accordingly, an object of the present invention is to provide an integrated reproducing/recording apparatus.

To achieve the above object, an integrated reproducing/recording apparatus in accordance with the present invention comprises a magnetic reproducing/recording device, an optical reproducing/recording device, and a spindle located therebetween. The magnetic reproducing/recording device has a magnetic disk with a center hole and a magnetic pickup head. The optical reproducing/recording device has an optical disk with a center hole and an optical pickup head. The spindle has fixtures at each end thereof. The magnetic disk or the optical disk can be fixed, one at a time, on a respective end of the spindle.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
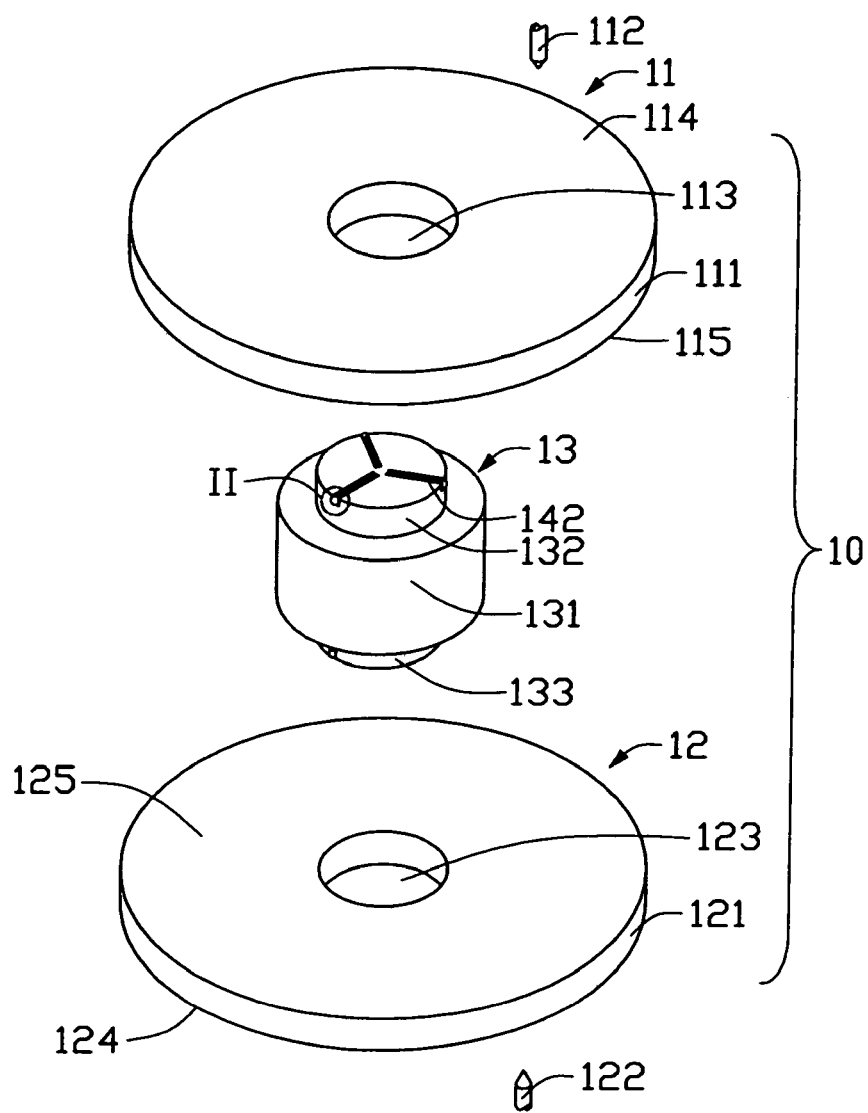
FIG. 1 is a perspective view of an integrated reproducing/recording apparatus in accordance with the present invention.

Referring to FIG. 1, an integrated reproducing/recording apparatus 10 in accordance with the present invention comprises a magnetic reproducing/recording device 11, an optical reproducing/recording device 12 and a spindle 13. The spindle 13 selectively mates with one of the magnetic reproducing/recording device 11 and the optical reproducing/recording device 12, and makes the corresponding mated reproducing/recording device operate.

The magnetic reproducing/recording device 11 has a magnetic disk 111 for signals storage and a magnetic pickup head 112 which reproduces signals from the magnetic disk 111 or records signals on the magnetic disk 111. The magnetic disk 111 is circular-shaped and has a center hole 113 defined therein. The magnetic disk 111 has a first surface 114 on which signals are recorded, and a second surface 115 on which no signals are recorded. The magnetic pickup head 112 is adjacent the first surface 114 of the magnetic disk 111.

The optical reproducing/recording device 12 has an optical disk 121 for signals storage and an optical pickup head 122 which reproduces signals from the optical disk 121 or records signals on the optical disk 121. The optical disk 121 is circular-shaped and has a center hole 123 defined therein. The optical disk 121 has a first surface 124 on which signals are recorded, and a second surface 125 on which no signals are recorded. The optical pickup head 122 is adjacent the first surface 124 of the optical disk 121.

The magnetic disk 111 is parallel to the optical disk 121 with the second surface 115 of the magnetic disk 111 facing the second surface 125 of the optical disk 121. The spindle 13 is located between the magnetic disk 111 and the optical disk 121. The spindle 13, the magnetic disk 111 and the optical disk 121 are coaxial. The spindle 13 can move between the magnetic disk 111 and the optical disk 121 in an axial direction of the spindle 13.

The spindle 13 has a body 131, a first table 132 and a second table 133 respectively extending from two ends of the body 131. The first table 132 and the second table 133 are respectively used for matching with the magnetic disk 111 and the optical disk 121. The body 131, the first table 132 and the second table 133 are columnar in shape. A diameter of the body 131 is greater than that of the first and second tables 132, 133, thus, steps (not labeled) are respectively formed at a joint of the body 131 and the tables 132, 133 for positioning the magnetic disk 111 and the optical disk 121 thereagainst. The diameter of the first table 132 is slightly less than a diameter of the center hole 113 of the magnetic disk 111. The diameter of the second table 133 is slightly less than a diameter of the center hole 123 of the optical disk 121. A length of the first table 132 and the second table 133 are respectively slightly longer than a thickness of the magnetic disk 111 and optical disk 121.

Figure 2:
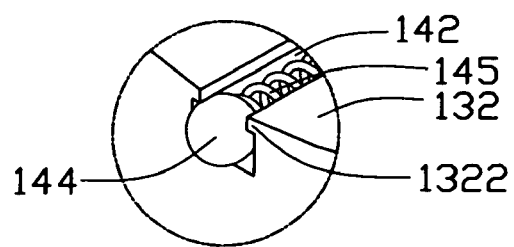
FIG. 2 is a partial, enlarged view of a spindle of the integrated reproducing/recording apparatus shown in FIG. 1.
Figure 3:
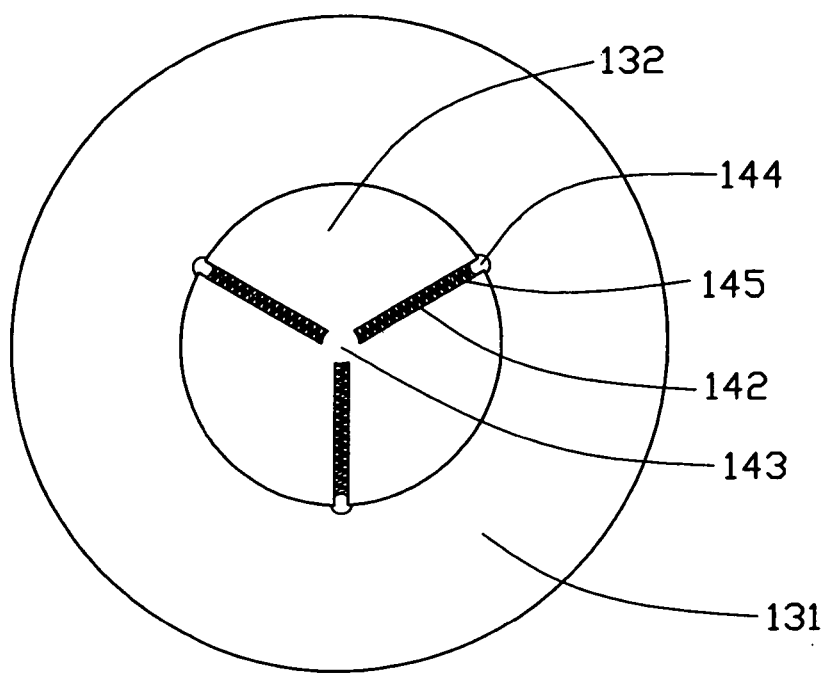
FIG. 3 is a top view of the spindle of the integrated reproducing/recording apparatus shown in FIG. 1.

Referring to FIGS. 2 and 3, a plurality of evenly spaced grooves 142 are defined in an end surface of the first table 132, each groove 142 directed outwardly from an axis 143 in a radial direction of the first table 132. Each groove 142 moveably receives a ball 144 in an outward end thereof and a spring 145 located between the ball 144 and an inner end of the groove 142 near the axis 143 of the first table 132. The ball 144 can move in a radial direction of the first table 132, and partially protrudes from an arced outer surface of the first table 132. A protrusion 1322 is defined in the first table 132 for restricting the movement of the ball 144 to remain within the groove 142 in the first table 132. When an inwardly directed force acts against the ball 144, the ball 144 moves towards the axis 143 in a radial direction of the first table 132. When the force is withdraw, the return force of the spring 145 makes the ball 144 move outwardly to a position where the ball 144 partially protrudes from the arced surface of the first table 132. Note that a diameter of the ball 144 is larger than a width of the groove 142 at a point near the arced surface of the first table 132, so the ball 144 is prevented from leaving the groove 142.

When the spindle 13 moves towards the magnetic reproducing/recording device 11, and the first table 132 moves into the center hole 113, an edge of the center hole 113 of the magnetic disk 111 engages with the balls 144 of the first table 132 and makes them move towards the axis 143 of the first table 132 to a position where the balls 144 are wholly accommodated in the grooves 142. Thus, the first table 132 can easily pass through the center hole 113 of the magnetic disk 111, for the diameter of the first table 132 is slightly less than that of the center hole 113 of the magnetic disk 111. When the first table 132 reaches the first surface 114 of the magnetic disk 111, the balls 144 are partially ejected from the grooves 142 under force by the springs 145 and cause the magnetic disk 111 to become fixed on the spindle 13. Thereafter, when the spindle 13 moves towards the optical reproducing/recording device 12, the edge of the center hole 113 of the magnetic disk 111 engages with the balls 144 of the first table 132, moving them towards the axis 143 of the first table 132 until the balls 144 are wholly accommodated in the grooves 142, thus allowing the first table 132 to pass back through and out of the center hole 113 of the magnetic disk 111. Thus, the magnetic disk 111 separates from the spindle 13.

The second table 133 has a same structure of the first table 132, and engages with the optical disk 121 in the same way.

Figure 4:
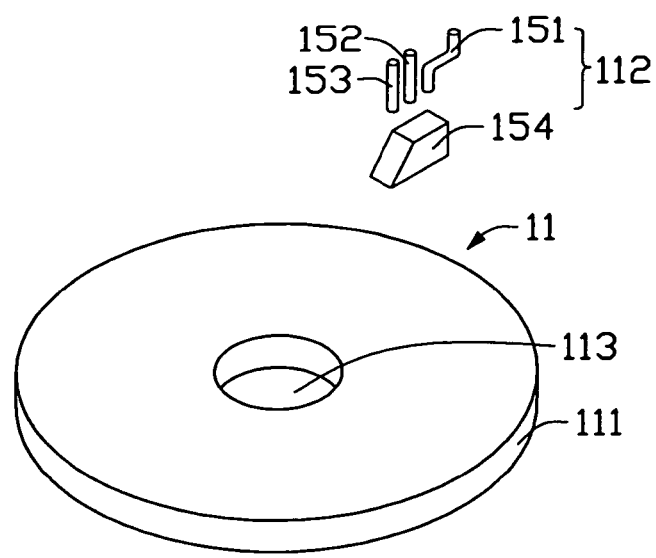
FIG. 4 is a perspective view of a magnetic reproducing/recording device of the integrated reproducing/recording apparatus shown in FIG. 1.

Referring to FIG. 4, the magnetic pickup head 112 has a write and read subassembly (not labeled) with two write heads 151, 152 and a read head 153. The write heads 151, 152 are for recording signals on the magnetic disk 111, and the read head 153 is for reproducing signals from the magnetic disk 111. A slant guide element 154 is located between the write and read subassembly and the magnetic disk 111. The slant guide element 154 prevents the write and read subassembly from violently colliding with the magnetic disk 111, thus avoiding damage to the write and read subassembly or the magnetic disk 111. When the write head 151, 152 records the magnetic disk 111 or the read head 153 reproduces the magnetic disk 111, the magnetic pickup head 112 is guided by a slant surface (not labeled) of the slant guide element 154 to softly contact the surface of the magnetic disk 111.

Figure 5:
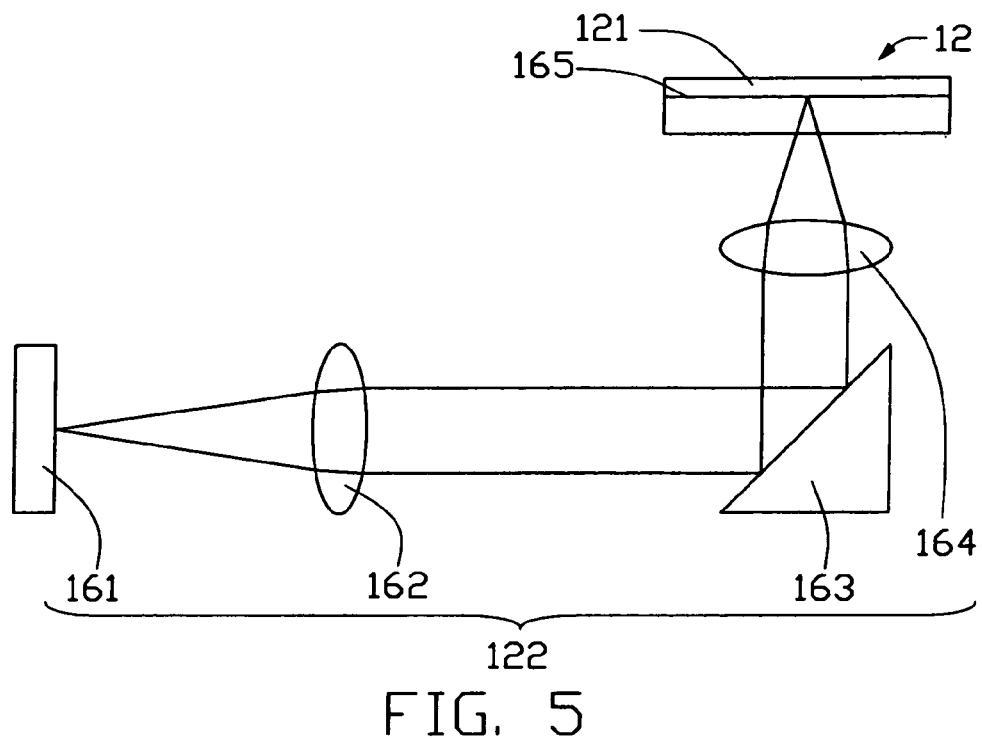
FIG. 5 is a diagrammatic view of an optical reproducing/recording device of the integrated reproducing/recording apparatus shown in FIG. 1, wherein the optical disk is a CD.
Figure 6:
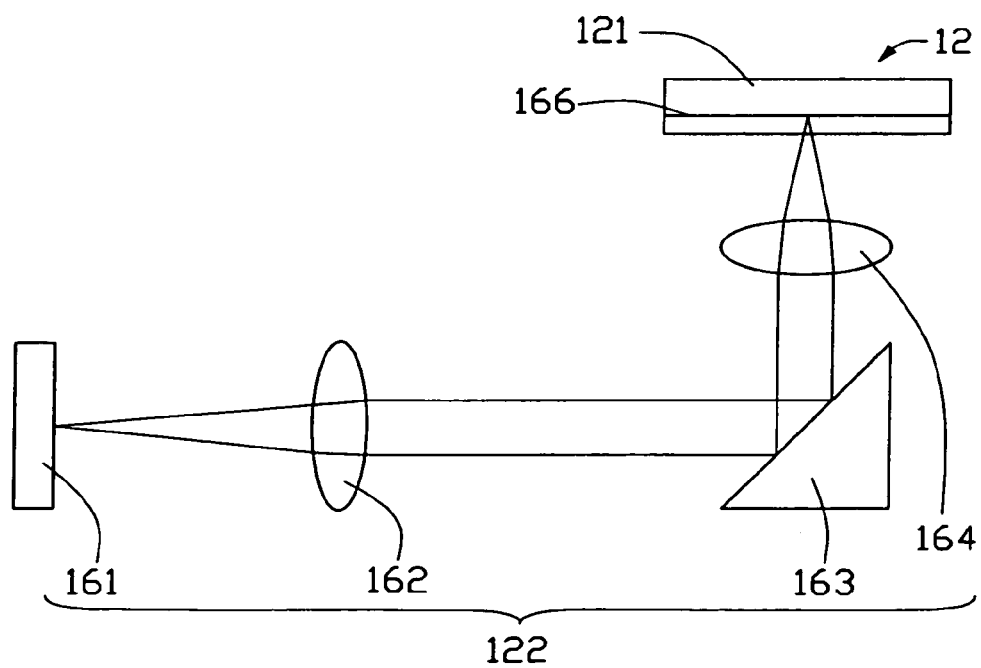
FIG. 6 is a diagrammatic view of an optical reproducing/recording device of the integrated reproducing/recording apparatus shown in FIG. 1, wherein the optical disk is a DVD.

Referring to FIGS. 5 and 6, the optical pickup head 122 reproduces/records signals from/to the optical disk 121, wherein the optical disk 121 is a CD with an signal record layer 165 or a DVD with an signal record layer 166. The optical pickup head 122 has an integrated transmitter and receiver subassembly 161, a collimator 162, a prism 163 and an object lens 164. The integrated transmitter and receiver subassembly 161 emits laser signals to the optical disk 121 and receives laser signals reflected by the optical disk 121. The integrated transmitter and receiver subassembly 161 has transmitters and receivers integrated together, and can transmit and receive two different wavelength lasers. Laser signals from the integrated transmitter and receiver subassembly 161 are collimated to parallel light rays by the collimator 162. Parallel light rays from the collimator 162 are redirected by the prism 163 and are transmitted to the object lens 164. The object lens 164 focuses the light rays on the signal record layer 165, 166 of the optical disk 121. The optical disk 121 reflects the light back to the integrated transmitter and receiver subassembly 161, such signals successively transmitting through the object lens 164, the prism 163, and the collimator 162.

The CD and DVD respectively have a signal record layer 165, 166. The two signal record layers 165, 166 each have a different position in the optical disk. In order that the integrated reproducing/recording apparatus can reproduce/record the CD and DVD, the integrated transmitter/receiver of the apparatus emits two different wavelength lasers, one for each corresponding optical storage medium. When the optical disk 121 is a CD, referring to FIG. 5, the optical pickup head 122 emits a laser having a 780 nm wavelength to reproduce/record the CD, and the light is focused on the signal record layer 165 of the CD. When the optical disk 121 is a DVD, referring to FIG. 6, the optical pickup head 122 emits a laser having a 650 nm wavelength to reproduce/record the DVD, and the light is focused on the signal record layer 166 of the DVD.

Figure 7:
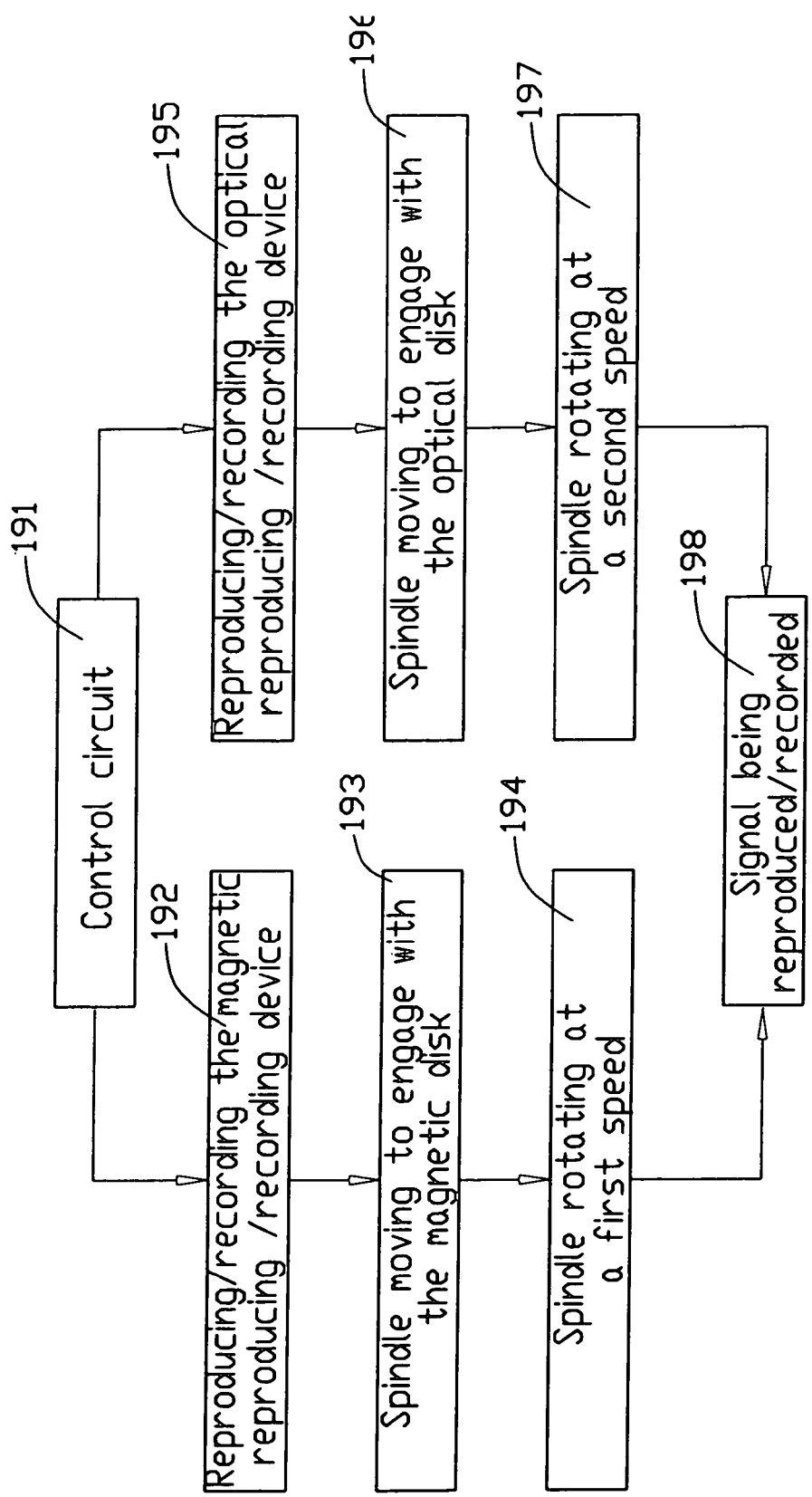
FIG. 7 is a flow chart of the operation of the integrated reproducing/recording apparatus in accordance with the present invention.

Referring to FIG. 7, the operation of the integrated reproducing/recording apparatus 10 is disclosed. First, a control circuit sends an order selecting a reproducing/recording device (S191). When the order designates the magnetic reproducing/recording device (S192), the spindle 13 moves towards the magnetic reproducing/recording device 11 and engages with the magnetic disk 111 (S193). Then, the spindle 13 rotates at a first speed (S194), and signals are reproduced from/recorded to the magnetic disk 111 by the magnetic pickup head 112 (S198). When the order designates the optical reproducing/recording device (S195), the spindle 13 moves towards the optical reproducing/recording device 12 and engages with the optical disk 121 (S196). Then, the spindle 13 rotates at a second speed (S197), and signals are reproduced from/recorded to the optical disk 121 by the optical pickup head 122 (S198).

It is obvious that the magnetic disk or the optical disk can be engaged with the spindle using other fixture element designs.

Compared with a conventional reproducing/recording apparatus, the integrated reproducing/recording apparatus 10 in accordance with the present invention has the magnetic reproducing/recording device 11 and the optical reproducing/recording device 12 integrated together. By moving the spindle 13, the apparatus 10 can selectively reproduce/record signals on the magnetic disk 11 or optical disk 12, thus reducing the space taken up by the apparatus in a computer system.

Although the present invention has been described with reference to a specific embodiment, it should be noted that the described embodiment is not necessarily exclusive and that various changes and modifications may be made to the described embodiment without departing from the scope of the invention as defined by the appended claims. For example, using a moveable gear set to respectively engaged with the corresponding magnetic disk or optical disk can also perform respective recording at different recording speeds.

What is claimed is:

1. An integrated reproducing/recording apparatus comprises:
   a first reproducing/recording device comprising a first storage medium and a first pickup head for reproducing signals from the first storage medium or recording signals on the first storage medium, said first storage medium having a center hole defined therethrough;
   a second reproducing/recording device comprising a second storage medium and a second pickup head for reproducing signals from the second storage medium or recording signals on the second storage medium, said second storage medium having a center hole defined therethrough; and
   a spindle located between the first and second reproducing/recording devices and having a first and second fixtures located at two ends thereof,
   wherein, the spindle moves between the first and second reproducing/recording devices and respectively engages with either the first or the second reproducing/recording device, and when the spindle moves to the first reproducing/recording device, the first fixture of the spindle is engaged with the center hole of the first storage medium to fix the first storage medium on the spindle, and when the spindle moves to the second reproducing/recording device, the second fixture of the spindle is engaged with the center hole of the second storage medium to fix the second storage medium on the spindle.

2. The integrated reproducing/recording apparatus in accordance with claim 1, wherein the spindle comprises a body and two tables respectively extending from two ends of the body, the body and two tables being arranged along one axis of the spindle, the two tables respectively having a plurality of grooves defined in an end surface thereof, said each groove directed outwardly from the axis in a radial direction of the corresponding table.

3. The integrated reproducing/recording apparatus in accordance with claim 2, wherein each fixture comprises a plurality of elastic elements and balls, each groove accommodates an elastic element and a ball, and the elastic element is engaged between the ball and a wall of the groove new the axis of the spindle.

4. The integrated reproducing/recording apparatus in accordance with claim 3, wherein the first storage medium is a magnetic disk, the second storage medium is an optical disk, and the magnetic and optical disks are parallel with each other.

5. The integrated reproducing/recording apparatus in accordance with claim 4, wherein a signal recording surface of each of the magnetic and optical disks faces away from the spindle.

6. The integrated reproducing/recording apparatus in accordance with claim 5, wherein the first reproducing/recording device has a slant guide element located between the first pickup head and the first storage medium, said slant guide element guiding the first pickup head to contact with the magnetic disk.

7. The integrated reproducing/recording apparatus in accordance with claim 5, wherein the second pickup head is an optical pickup head which has an integrated transmitter and receiver subassembly, a collimator, a prism and an object lens, and the integrated transmitter and receiver subassembly can transmit and receive two different wavelength lasers.

8. The integrated reproducing/recording apparatus in accordance with claim 1, wherein the spindle rotates at a first speed when the spindle engages with the first storage medium, and the spindle rotates at a second speed when the spindle engages with the second storage medium.

9. An integrated reproducing/recording apparatus comprising:
   a magnetic reproducing/recording device comprising a magnetic disk and a magnetic pickup head for reproducing signals from the magnetic disk or recording signals on the magnetic disk, said magnetic disk having a center hole defined therethrough;
   an optical reproducing/recording device comprising an optical disk and an optical pickup head for reproducing signals from the optical disk or recording signals on the optical disk, said optical disk having a center hole defined therethrough; and
   a spindle comprising a body and a first and second tables respectively extending from two ends of the body, said the first and second tables respectively having a first and second fixtures defined thereon;
   wherein, the spindle is located between and can be moved between the magnetic and optical reproducing/recording devices, the first and second fixtures can respectively engage with the center hole of the magnetic and optical disks.

10. The integrated reproducing/recording apparatus in accordance with claim 9, wherein the magnetic and optical pickup heads are respectively adjacent a surface of the magnetic and optical disks, said surface facing away from the spindle.

11. The integrated reproducing/recording apparatus in accordance with claim 10, wherein a diameter of the body is greater than that of the first and second tables.

12. The integrated reproducing/recording apparatus in accordance with claim 11, wherein a diameter of the first table is less than that of the center hole of the magnetic disk, and a diameter of the second table is less than that of the center hole of the optical disk.

13. The integrated reproducing/recording apparatus in accordance with claim 12, wherein a length of the first table and the second table is respectively longer than the thickness of the magnetic disk and the optical disk.

14. The integrated reproducing/recording apparatus in accordance with claim 13, wherein the first and second tables respectively have a plurality of grooves defined in the end surface thereof, said each groove directed outwardly from an axis of the spindle in a radial direction of the corresponding table.

15. The integrated reproducing/recording apparatus in accordance with claim 14, wherein the fixture comprises a plurality of elastic elements and balls, each groove accommodates an elastic element and a ball, and the elastic element is positioned between the ball and a wall of the groove near the axis of the table.

16. The integrated reproducing/recording apparatus in accordance with claim 15, wherein the elastic element is positioned between the ball and the wall of the groove near the axis of the table, and said ball partially protrudes from an arced surface of the spindle.

17. The integrated reproducing/recording apparatus in accordance with claim 15, wherein the diameter of the balls is larger than a width of the groove at a point near the arced surface of the corresponding table.

18. The integrated reproducing/recording apparatus in accordance with claim 9, wherein the spindle rotates at a first speed when the first fixture of the first table engages with the center hole of the magnetic disk, the spindle rotates at a second speed when the second fixture of the second table engages with the center bole of the optical disk.

19. The integrated reproducing/recording apparatus in accordance with claim 9, wherein the magnetic and optical disks are parallel with each other, and their signal recording surfaces face away from the spindle.

20. The integrated reproducing/recording apparatus in accordance with claim 19, wherein the magnetic reproducing/recording device has a slant guide element located between the magnetic pickup head and the magnetic disk, said slant guide element guiding the magnetic pickup head to contact with the magnetic disk.

21. The integrated reproducing/recording apparatus in accordance with claim 20, wherein the optical pickup head has an integrated transmitter and receiver subassembly, a collimator, a prism and an object lens, and the integrated transmitter and receiver subassembly can transmit and receive two different wavelength lasers.

22. An integrated reproducing/recording apparatus comprising:
 a magnetic reproducing/recording device comprising a magnetic disk and a magnetic pickup head for reproducing signals from the magnetic disk or recording signals on the magnetic disk, said magnetic disk having a center hole defined therethrough; an optical reproducing/recording device comprising an optical disk and an optical pickup head for reproducing signals from the optical disk or recording signals on the optical disk, said optical disk having a center hole defined therethough;
 and a spindle comprising a body and a first and second tables respectively extending from two ends of the body;
 a first fixture element; and
 a second fixture element;
 wherein, the spindle is located between and can be moved between the magnetic and optical reproducing/recording devices, the first and second fixture elements can respectively mate with the first and second tables to respectively fix the magnetic and optical disk on the spindle.

23. The integrated reproducing/recording apparatus in accordance with claim 22, wherein the magnetic pickup head is adjacent a surface of the magnetic disk facing away from the spindle, the optical pickup head is adjacent a surface of the optical disk facing away from the spindle.

24. The integrated reproducing/recording apparatus in accordance with claim 23, wherein a diameter of the body of the spindle is greater than that of the first and second tables of the spindle.

25. The integrated reproducing/recording apparatus in accordance with claim 24, wherein a diameter of the first and second tables is respectively less than that of the center hole of the magnetic and optical disks.

26. The integrated reproducing/recording apparatus in accordance with claim 25, wherein the magnetic and optical disks are parallel to each other, and a signal recording surface of the magnetic and optical disks faces away from the spindle.

27. The integrated reproducing/recording apparatus in accordance with claim 26, wherein the magnetic reproducing/recording device has a slant guide element located between the magnetic disk and the magnetic pickup, said slant guide element guiding the magnetic pickup head contact with the magnetic disk.

28. The integrated reproducing/recording apparatus in accordance with claim 27, wherein the optical pickup head has an integrated transmitter and receiver subassembly, a collimator, a prism and an object lens, and the integrated transmitter and receiver subassembly can transmit and receive two different wavelength lasers.

29. The integrated reproducing/recording apparatus in accordance with claim 28, wherein the spindle rotates at a first speed when the spindle engages with the magnetic disk, and the spindle rotates at a second speed when the spindle engages with the optical disk.

* * * * *